United States Patent
Wong et al.

(10) Patent No.: US 10,804,543 B2
(45) Date of Patent: Oct. 13, 2020

(54) ULTRATHIN, TERNARY ALLOY PTRUFE NANOWIRES, AND METHODS OF MAKING SAME

(71) Applicant: The Research Foundation for The State University of New York, Albany, NY (US)

(72) Inventors: Stanislaus Wong, Stony Brook, NY (US); Christopher Koenigsmann, Mahopac, NY (US); Megan Scofield, Laurel, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 611 days.

(21) Appl. No.: 15/092,530

(22) Filed: Apr. 6, 2016

(65) Prior Publication Data

US 2016/0293969 A1    Oct. 6, 2016

Related U.S. Application Data

(60) Provisional application No. 62/143,517, filed on Apr. 6, 2015.

(51) Int. Cl.
*H01M 4/92*    (2006.01)
*B82Y 40/00*    (2011.01)
(Continued)

(52) U.S. Cl.
CPC ........... *H01M 4/921* (2013.01); *H01M 4/928* (2013.01); *B82Y 30/00* (2013.01); *B82Y 40/00* (2013.01);
(Continued)

(58) Field of Classification Search
CPC ........ B82Y 40/00; B82Y 30/00; H01M 4/921; H01M 4/928; H01M 8/1011; H01M 4/925;
(Continued)

(56) References Cited

U.S. PATENT DOCUMENTS 8,178,462 B2    5/2012    Konishi
8,304,089 B1 *  11/2012   Song .................... B22F 1/0025
                                             428/605
(Continued)

OTHER PUBLICATIONS

Sigma-Aldrich, "Hexadecyltrimethylammonium bromide".*
(Continued)

*Primary Examiner* — Mayla Gonzalez Ramos
(74) *Attorney, Agent, or Firm* — Hoffmann & Baron, LLP

(57) ABSTRACT

The present invention provides a method of producing ternary metal-based nanowire networks. The method comprises combining an aqueous mixture of a platinum hydrate, a ruthenium hydrate, and an iron hydrate with a solution of hexadecyltrimethylammonium bromide in chloroform to form an inverse micellar network; adding a reducing agent to reduce metal ions within the inverse micellar network; and isolating the nanowires. The relative amounts of the platinum, ruthenium and iron in the mixture correlate to the atomic ratio of the platinum, ruthenium and iron in the ternary nanowires. The diameters of the ternary nanowires are from about 0.5 nm to about 5 nm.

7 Claims, 10 Drawing Sheets

(51) Int. Cl.
*B82Y 30/00* (2011.01)
*H01M 8/1011* (2016.01)

(52) U.S. Cl.
CPC .......... *H01M 8/1011* (2013.01); *Y02E 60/523* (2013.01); *Y10S 977/762* (2013.01); *Y10S 977/81* (2013.01); *Y10S 977/896* (2013.01); *Y10S 977/932* (2013.01)

(58) Field of Classification Search
CPC .. Y02E 60/523; Y10S 977/762; Y10S 977/81; Y10S 977/896; Y10S 977/932
See application file for complete search history.

(56) References Cited

U.S. PATENT DOCUMENTS

| | | | |
|---|---|---|---|
| 2008/0305377 A1* | 12/2008 | Shui | B22F 1/0025 429/479 |
| 2011/0275011 A1* | 11/2011 | Zhu | H01M 4/921 429/524 |
| 2013/0171054 A1* | 7/2013 | Kim | C01B 31/0233 423/447.2 |

OTHER PUBLICATIONS

Basri et al., "Novel Anode Catalyst for Direct Methanol Fuel Cells," The Scientific World Journal, vol. 2014, Article ID 547604, 8 pages, Flindawi Publishing Corporation.

* cited by examiner

ULTRATHIN, TERNARY ALLOY PTRUFE NANOWIRES, AND METHODS OF MAKING SAME

CROSS-REFERENCE TO RELATED APPLICATIONS

This application claims the benefit of U.S. Provisional Application Ser. No. 62/143,517, filed Apr. 6, 2015, which application is incorporated herein by reference in its entirety. This invention was made with government support under grant number DEAC0298CH10886 awarded by the Department of Energy. The government has certain rights in this invention.

BACKGROUND OF THE INVENTION

With the growing demand for alternative energy sources, much research effort has focused on the development of direct methanol fuel cells (DMFCs) as a viable energy conversion device. Specifically, DMFCs consist of both an anode and a cathode at which the oxidation of methanol and the reduction of oxygen can respectively occur. Specifically, eqn (1) and (2) highlight the overall and half-cell reactions, respectively, for the DMFC process.

$$CH_3OH + 3/2 O_2 \rightarrow CO_2 + 2H_2O \quad (1)$$

$$CH_3OH + H_2O \rightarrow CO_2 + 6H^+ + 6e^- \quad (2)$$

Typically, Pt-based materials are used as MOR catalysts, due to their relatively high catalytic activities. However, this has proven to be problematic, since platinum is expensive because of its relative scarcity. Moreover, when Pt is incorporated into a catalyst, deleterious effects, such as surface poisoning, particle ripening, and dissolution, often arise, all of which lead to a decrease in the number of active sites available for MOR and thereby contribute to slow kinetics and poor durability.

One strategy to enhance the catalytic activity of Pt has been to incorporate other electrochemically active, more plentiful metals, such as ruthenium for example, thereby forming homogeneous $Pt_{1-x}Ru_x$ alloys. Specifically, outstanding MOR performance has already been observed in $Pt_{1-x}Ru_x$ systems using a range of Ru concentrations ('x'=0.07–0.33). The presence of 30% Ru dopant, as in the $Pt_7Ru_3$ system, yielded exceptionally high activities.

In PtRu systems, the MOR reaction proceeds through a plausible "bifunctional mechanism," wherein adsorbed hydroxide ($OH^-$) species at the Ru site facilitate the oxidation and removal of the CO intermediate adsorbed onto the Pt active sites. Consequently, more Pt active sites become accessible for methanol oxidation, thereby enhancing catalytic performance at lower overpotentials. Although binary alloys clearly represent a positive step forward, there is a functional need for improvement, due to issues such as long-term catalytic durability, which ultimately hinder the current commercial viability of DMFCs.

As such, in recent years, efforts have shifted beyond the use of bimetallic catalysts to the study of more complex ternary 'platforms', incorporating three different transition metals. Specifically, ternary systems including but not limited to PtRuNi, PtRuFe, PtRuSn, PtRuMo, PtRuRh, and PtRuAu have been investigated as potential electrocatalysts for MOR. The addition of this extra metal not only decreases the overall cost of the catalyst by reducing the amount of Pt utilized but also improves catalytic activity through a favorable synergistic electronic interaction between the Pt active sites and the transition metal dopants.

Specifically, the inherent structural coupling between the dopant metal lattice and the Pt lattice forces a compression strain upon the Pt lattice, due to the shorter interatomic distance of the dopant sites as compared with Pt. This so-called "ligand effect" therefore increases the d-orbital overlap, contributing to a down-shift in energy for the weighted center of the d-band. In essence, electron density is withdrawn from the Pt d-band towards that of the dopant metals. In terms of practical consequences for catalysis, both the lower weighted center of the d-band and the reduced electron density collectively contribute to a lowered CO affinity as a result of a concomitant weakening of the overlap between the Pt d-orbitals and the CO $\pi^*$-orbitals. Hence, CO coverage is effectively reduced, which correspondingly increases the number of exposed Pt active sites available for MOR.

In this light, utilizing a combinatorial computational approach, a wide array of ternary and quaternary alloy electrocatalysts were analyzed, and it was determined that PtRuCo, PtRuNi, as well as PtRuFe catalysts exhibited significantly higher CO tolerance values as compared with binary PtRu catalysts. Experimentally, PtRuNi nanoparticles have demonstrated that the incorporation of Ni into a PtRu alloy results in an increase in specific activity, which was as much as ~2.2-fold higher as compared with that of the PtRu catalyst, an observation attributable to electron transfer from Ni to Pt. Similarly, the activities of multiple ternary nanoparticle electrocatalysts, PtRuM ('M'=Co, Ni, Fe) have been compared; in particular, both PtRuCo and PtRuNi electrocatalysts evinced a favorable 50 mV negative shift in the onset potential for MOR. Moreover, the MOR activities of FePtPd nanowires were compared with that of PtFe, PtPd, and Pt catalysts. It was found that $Fe_{28}Pt_{38}Pd_{34}$ electrocatalysts also exhibited a favorable negative shift in onset potential for methanol oxidation as well as a corresponding increase in the peak current density as compared with both binary alloy and Pt analogues. All of these examples demonstrate and corroborate the notion that by incorporating a third transition metal, such as Fe, CO tolerance can be increased, and as a result, the activity can be enhanced due to the availability of active sites.

Moreover, PtRuM electrocatalysts (wherein 'M'=Co, Ni, and Fe, i.e. incorporating first row transition metals) have become particularly appealing, because Fe, for instance, represents a more plentiful, lower cost, and reasonably less toxic alternative, especially as compared with bulk Pt.

SUMMARY OF THE INVENTION

In one aspect, the present invention provides a method of producing ternary metal-based nanowire networks. In one embodiment, the method comprises combining an aqueous mixture of a platinum hydrate, a ruthenium hydrate, and an iron hydrate with a solution of hexadecyltrimethylammonium bromide in chloroform to form an inverse micellar network; adding a reducing agent to reduce metal ions within the inverse micellar network; and isolating the nanowires. The relative amounts of the platinum, ruthenium and iron in the mixture correlate to the atomic ratio of the platinum, ruthenium and iron in the ternary nanowires. The diameters of the ternary nanowires are from about 0.5 nm to about 5 nm. In typical embodiments, the formula of the nanowires is $Pt_7Ru_2Fe$, $Pt_7Ru_{1.5}Fe_{1.5}$, $Pt_7RuFe_2$, or $Pt_7Ru_{0.5}Fe_{2.5}$.

In one embodiment, the platinum hydrate is hexachloroplatinic acid hydrate ($H_2PtCl_6 \cdot 6H_2O$). In one embodiment, the ruthenium hydrate is ruthenium(III) chloride hydrate (RuCl$_3$.xH$_2$O). In one embodiment, the iron hydrate is iron(III) nitrate nonahydrate (Fe(NO$_3$)$_3$.9H$_2$O). In one embodiment, the reducing agent is sodium borohydride (NaBH$_4$).

In another aspect of the present invention, ternary metal-based nanowires are provided. Typically, the nanowires have a diameter of about 0.5 nm to about 5 nm, more typically about 2 nm. Typically, the nanowires have formula Pt$_7$Ru$_2$Fe, Pt$_7$Ru$_{1.5}$Fe$_{1.5}$, Pt$_7$RuFe$_2$, or Pt$_7$Ru$_{0.5}$Fe$_{2.5}$.

In one embodiment, the ternary metal-based nanowires are segmented and comprise single crystalline segments. In one embodiment, the ternary metal-based nanowires have a specific activity of at least about ten times as great as the specific activity of a similar binary platinum-iron or platinum-ruthenium nanowire, that is, a binary nanowire of similar dimensions.

DETAILED DESCRIPTION OF THE INVENTION

Figure 1:
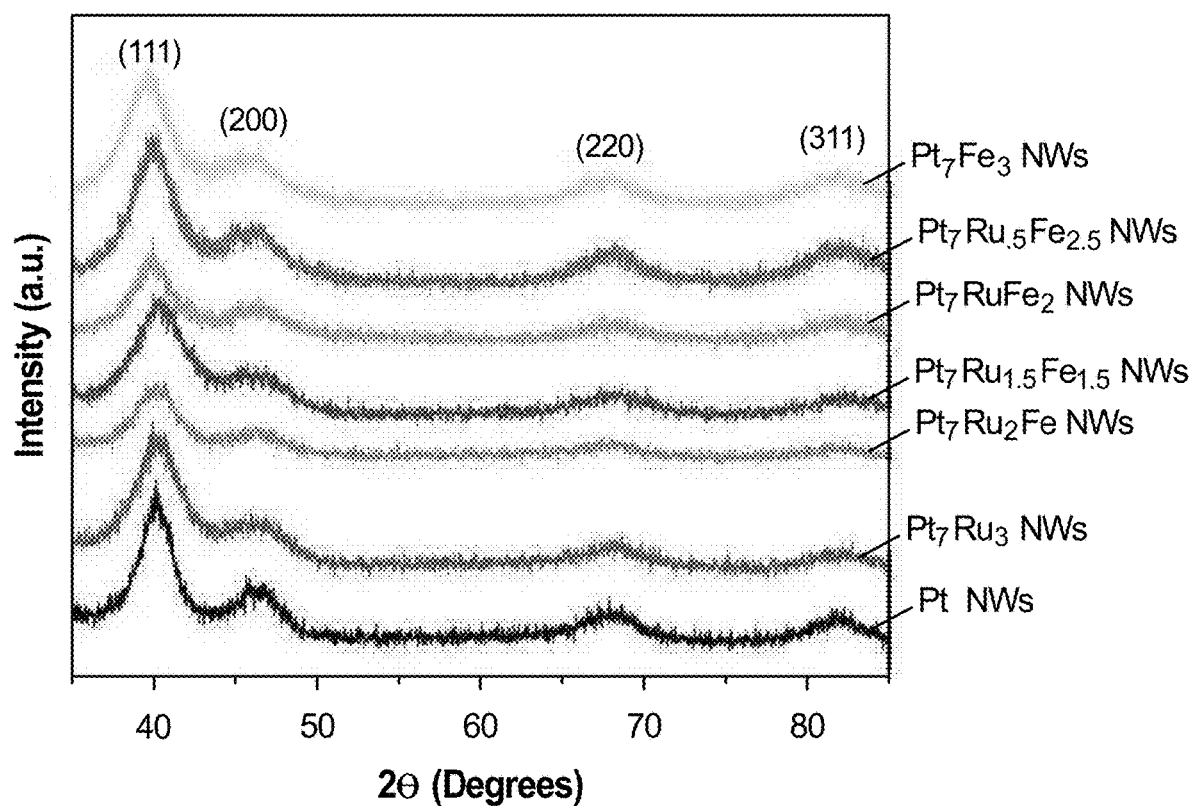
FIG. 1 shows XRD patterns for Pt NWs, Pt$_7$Ru$_3$ NWs, Pt$_7$Ru$_2$Fe NWs, Pt$_7$Ru$_{1.5}$Fe$_{1.5}$ NWs, Pt$_7$RuFe$_2$ NWs, Pt$_7$Ru$_{0.5}$Fe$_{2.5}$ NWs, and Pt$_7$Fe$_3$ NWs, respectively. All peaks are labeled and correspond to a Pt fcc structure.

The following detailed description of certain embodiments of the present invention will be made in reference to the accompanying drawings. In describing the invention, explanation about related functions or constructions known in the art are omitted for the sake of clearness in understanding the concept of the invention, to avoid obscuring the invention with unnecessary detail.

Throughout this specification, quantities are defined by ranges, and by lower and upper boundaries of ranges. Each lower boundary can be combined with each upper boundary to define a range. The lower and upper boundaries should each be taken as a separate element.

Ternary Metal-Based Nanowires

In one embodiment, the present invention provides ultra-thin one-dimensional (1D) metal nanostructures including ternary metal-based nanowires. The nanowires have the formula Pt$_7$Ru$_2$Fe, Pt$_7$Ru$_{1.5}$Fe$_{1.5}$, Pt$_7$RuFe$_2$, or Pt$_7$Ru$_{0.5}$Fe$_{2.5}$.

The ternary metal-based nanowires are segmented and comprise single crystalline segments. A single crystalline segment can stretch up to about hundreds of nanometers.

The specific activity of the nanowire is at least about ten times as great as the specific activity of a binary platinum-iron or platinum-ruthenium nanowire.

The diameter of the nanowire is about 0.5 nm to about 5 nm. Examples of other lower boundaries of this range include about 1 nm, about 1.5 nm, about 2 nm and about 3 nm. Examples of other upper boundaries of this range include about 2.5 nm, about 3 nm, about 3.5 nm and about 4 nm. Typically, the nanowires are about 2 nm in diameter. The aspect ratio of the nanowires is typically greater than about 5. The length of a nanowire can be up to any desired length, e.g., up to about 1 million nm.

The nanowires of the present invention are substantially free of organic contaminants (e.g., capping agents, surface ligands or surfactants) and impurities (e.g., non-metallic impurities, such oxides, halides, sulfides, phosphides, or nitrides) without employing additional purification steps.

Additionally, the nanowires are free of organic surfactant molecular groups (including nonionic surfactants, cationic surfactants, and anionic surfactants), such as bis(2-ethylhexyl)sulphosuccinate, undecylic acid, sodium dodecyl sulfate (SDS), Triton X-100, decylamine, or double-hydrophilic block copolymers, which are present on the surfaces of prior art nanostructures.

The nanowires of the invention are crystalline and solid. Preferably, the nanowires are at least 95%, more preferably at least 99%, and most preferably virtually completely free of defects and/or dislocations. As defined in this specification, defects are irregularities in the crystal lattice. Some examples of defects include a non-alignment of crystallites, an orientational disorder (e.g., of molecules or ions), vacant sites with the migrated atom at the surface (Schottky defect), vacant sites with an interstitial atom (Frenkel defects), and non-stoichiometry of the crystal. An example of a dislocation is a line defect in a crystal lattice.

Methods of Making the Ternary Metal-Based Nanowires

In one embodiment, the present invention provides a method of producing the ternary metal-based nanowire. The method comprises combining an aqueous mixture of a platinum hydrate, a ruthenium hydrate, and an iron hydrate with a solution of hexadecyltrimethylammonium bromide in chloroform to form an inverse micellar network. A reducing agent is added to the network to reduce metal ions within the inverse micellar network. The nanowires are isolated, typically by centrifuging.

The amounts of the platinum, ruthenium and iron in the nanowires can be controlled. In particular, the amount of each metal in the mixture correlates to the atomic ratio of the platinum, ruthenium and iron in the ternary nanowires. Typical examples of the nanowires include $Pt_7Ru_2Fe$, $Pt_7Ru_{1.5}Fe_{1.5}$, $Pt_7RuFe_2$, and $Pt_7Ru_{0.5}Fe_{2.5}$.

Platinum hydrates, ruthenium hydrates and iron hydrates would be known to a skilled artisan. In one embodiment, the platinum hydrate is hexachloroplatinic acid hydrate ($H_2PtCl_6 \cdot 6H_2O$). In one embodiment, a ruthenium hydrate is ruthenium(III) chloride hydrate ($RuCl_3 \cdot xH_2O$). In one embodiment, an iron hydrate is iron(III) nitrate nonahydrate ($Fe(NO_3)_3 \cdot 9H_2O$). Suitable reducing agents include metal borohydrides, e.g., sodium borohydride.

In the present invention, iron-based PtRuM electrocatalysts have been systematically explored with the aim of correlating chemical composition with electrochemical activity in order to understand and fine tune the preparation of electrocatalysts for enhanced performance in both MOR and the formic acid oxidation reaction (FAOR). By incorporating Fe within a ternary alloy architecture, an increase in electrochemical stability by nearly 4-fold as compared with commercial PtRu standards has been demonstrated. In so doing, a serious limitation preventing the widespread commercialization of anode materials has been addressed (Koenigsmann et al., *Energy Environ. Sci.,* 2011, 4:1045-1528; Yuan et al., *Langmuir,* 2014, 30:5711-15).

As an additional parameter to tailoring chemical composition, the effect of electrocatalyst morphology upon corresponding activity was explored. Specifically, it is known that the use of anisotropic one-dimensional (1D) structures such as nanowires (NWs) and nanotubes (NTs) has led to significant improvements in electrocatalytic performance as compared with traditional, conventional zero-dimensional (0D) morphologies such as nanoparticles (NPs). The rationale is that crystalline 1D nanostructures possess (a) high aspect ratios, (b) fewer lattice boundaries, (c) long segments of smooth crystal planes, and (d) a low number of surface defect sites, all of which are desirable attributes for fuel cell catalysts. Furthermore, when the diameter of the 1D wire is decreased toward the ultrathin size regime (<5 nm), it was able to minimize the presence of not only intrinsic defect sites, which tend to alter the surface energy of the Pt, but also deleterious lattice boundary imperfections. Both are more susceptible to removal through decomposition, because the lower coordination Pt surface atoms become exposed and are therefore more prone to irreversible oxidation.

The present ultrathin, ternary PtRuFe NW electrocatalysts are synthesized using an ambient, wet synthesis method. Solution-based techniques are advantageous for the production of electrocatalysts, since they represent potentially straightforward, reasonably mild, high-yield, scalable, and cost-efficient processes. Specifically, the methodology used herein involves the reduction of metal precursors with sodium borohydride in the presence of a so-called "soft template," created by cetyltrimethylammonium bromide (CTAB) surfactant within a two-phase water-chloroform system (Song et al., *Nano Lett.,* 2007, 7:3650-5; Yang et al., *J. Phys. Chem. C,* 2009, 114:203-7). One of the advantages of this technique is that because the nucleation and growth of the wires are fundamentally controlled by the size and shape of the "soft template" pores, porous, high surface area networks of interconnected, "wormlike" metallic nanowires, possessing average diameters of as small as 1.9 nm, are created. Utilizing this protocol (Song et al., Yang et al.), the relative concentrations of Ru and Fe precursors were tuned, and a range of homogeneous alloyed ultrathin NWs were fabricated, as confirmed by the structural characterization data.

Figure 6:
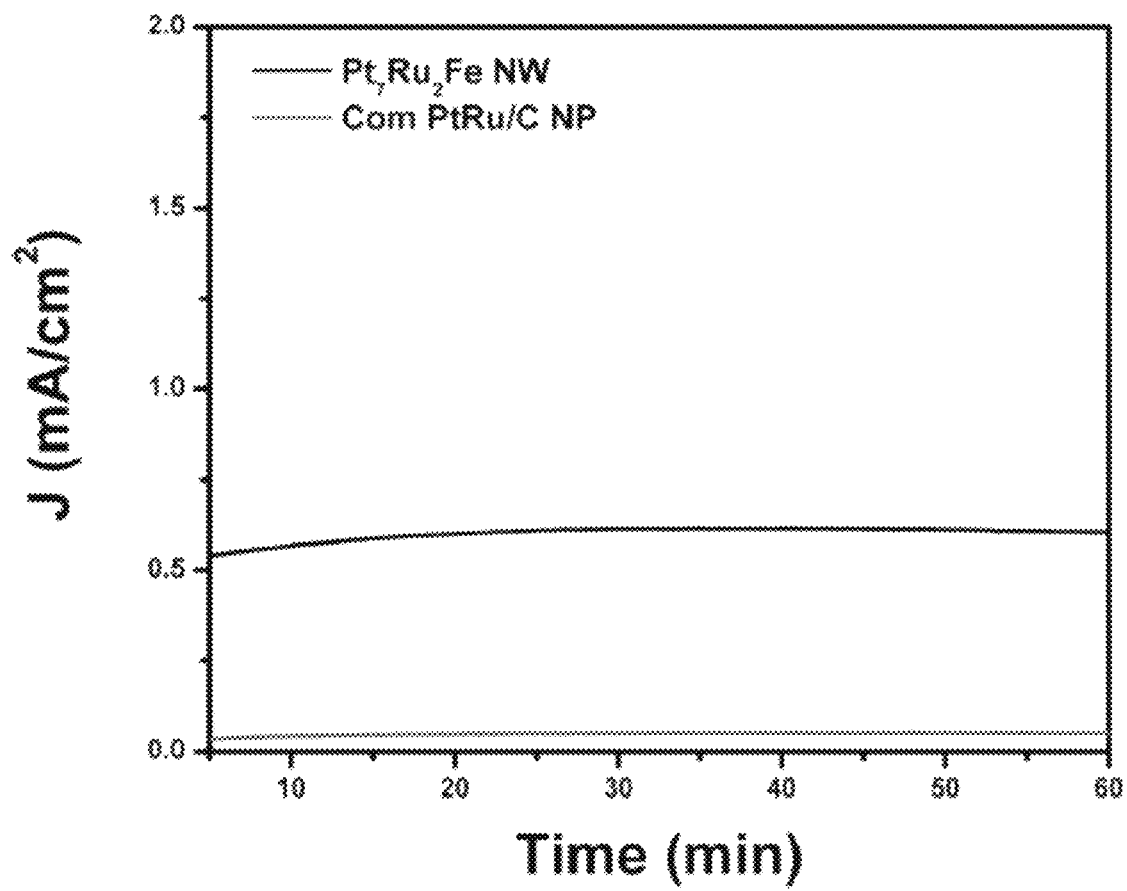
FIG. 6. Chronoamperometry measurements of optimized Pt$_7$Ru$_2$Fe NW catalysts as compared with commercial standards (i.e. PtRu NP/C) in an argon-saturated 0.1 HClO$_4$=0.5 M CH$_3$OH solution, obtained at a potential of 0.65 V vs. RHE for a period of 60 min.

Both the CO tolerance and the electrochemical activity of the NWs were investigated as a function of Ru and Fe content. Specifically, using $Pt_7Ru_3$ as the "starting" catalyst composition, upon the addition of 10% Fe to replace Ru content, the resulting $Pt_7Ru_2Fe$ NW catalyst gave rise to a negative shift of ~230 mV in onset potentials for CO stripping as well as to ~11 times higher MOR activity as compared with the mono-metallic Pt NW controls, rendering this as the best catalyst tested for MOR. Moreover, these results show significant improvements by comparison with currently available, commercial PtRu nanoparticle standards. Specifically, the present ternary NWs yielded an order of magnitude higher activity of 1.52 mA cm$^{-2}$ versus 0.15 mA cm$^{-2}$ for commercial NPs @ 0.7 V vs. RHE. Moreover, as the amount of Fe present in the samples increased from 10% to 25% and correspondingly the Ru content decreased from 20% to 5%, a shift in the onset for CO absorption towards higher potentials was observed, thereby indicating the presence of delayed kinetics. As a result, from an analysis of the data based on the volcano-type trend observed in FIG. 6, the $Pt_7Ru_2Fe$ NW catalyst represented a particularly attractive option for MOR.

To further explore the effects associated with varying the concentrations of the dopant metals, these catalysts were additionally analyzed for their performance in formic acid oxidation. It should be noted that ternary catalysts have rarely been tested for activity with respect to both complementary reactions, namely the methanol oxidation and formic acid oxidation reactions. In particular, when these catalysts were purposely used to oxidize formic acid, $Pt_7Ru_{1.5}Fe_{1.5}$ NWs maintained the lowest onset potential as compared with the other ternary samples, even $Pt_7Ru_2Fe$ NWs.

As a result, from the data for both MOR and FAOR, it was demonstrated that the actual chemical composition of the catalyst counts, because this parameter can be specifically used to finely tune the activity of the present NWs for enhanced performance. These data therefore highlight a strategy for using chemistry to rationally and controllably optimize activities for both MOR and FAOR.

EXAMPLES

Starting from a high-performance binary $Pt_7Ru_3$ sample as a "base control," a series of ternary PtRuM nanowire catalysts possessing various controlled atomic compositions of metal dopants (Ru and Fe) have been synthesized, utilizing an inverse micellar protocol that had not as yet been previously applied to such chemically complex electrocatalytic systems. As comparative controls, $Pt_7Ru_3$ NWs, $Pt_7Fe_3$ NWs, and Pt NWs were generated to probe the effect of tailoring chemical composition upon the corresponding electrochemical activity. The present ultrathin NW catalysts possessed diameters of approximately 2 nm and expected chemical compositions, as determined from EDAX data. HRTEM demonstrated that the presently synthesized nanowires were polycrystalline in nature and consisted of short segments of crystalline planes, as further corroborated by SAED patterns.

The collected CVs gave rise to shifts in the oxide region, suggesting that interactions between Pt, Ru, and Fe can be explained in the context of the bifunctional mechanism (associated with the alloying of Ru) and the ligand effect (ascribed to the presence of Fe in the alloy core). Specifically, the $Pt_7Ru_2Fe$ and $Pt_7Ru_3$ NW catalysts possessed the lowest onset of formation of Ru—OH species even with a mere 10% loss of Ru and a corresponding 10% increase in Fe content, suggestive of a ligand induced effect, likely as a result of the presence of Fe lowering the d-band center of Pt and thereby altering the electronic properties of the overall alloy. However, for ternary catalytic compositions possessing either a 15%, 20%, or even 25% addition of Fe with the concomitant loss of Ru, the onset potential perceptibly shifted to higher potentials, implying that the presence of 10% Fe content may actually represent the optimal PtRuFe composition for enhanced activity, since it evinced the lowest onset for MOR activity.

Such a finding would also suggest that the CO tolerance of the catalyst is not necessarily correlated with its corresponding MOR activity, since it was determined that the $Pt_7Ru_3$ NW catalyst possessed a better CO tolerance as compared with the $Pt_7Ru_2Fe$ NW catalyst but maintained a lower MOR activity. However, the $Pt_7Ru_{1.5}Fe_{1.5}$ NW catalyst represents the most optimized catalyst amongst the ones tested for formic acid oxidation reaction, and the observed electrochemical enhancement may be due to the synergistic interactions between Fe and Ru, since no significant changes in the CVs, such as shifts to lower potentials in the oxide region, were observed. The stability and durability of the present optimized $Pt_7Ru_2Fe$ NW catalyst as compared with a commercial PtRu NP standard were subsequently probed by chronoamperometry. The present NW system evinced a higher stability, further demonstrating its practicality and real potential as a stable, active, and viable MOR catalyst.

Overall, the present multifunctional catalysts not only demonstrated a decreased affinity towards CO as compared with the as-synthesized Pt catalyst control and commercial PtRu standards but also exhibited both higher MOR and FAOR activity as compared with as-prepared binary $Pt_7Ru_3$ and $Pt_7Fe_3$ NWs, mono-metallic Pt NWs, and commercial catalyst samples.

1. Synthesis of Binary PtRu and Ternary PtRuFe NWs

The synthesis of ternary metal-based nanowire networks (i.e. $Pt_7Ru_2Fe$, $Pt_7Ru_{1.5}Fe_{1.5}$, $Pt_7RuFe_2$, and $Pt_7Ru_{0.5}Fe_{2.5}$ NWs) has been accomplished by a solution technique based on confining metal growth within a soft template consisting of a network of inverse wormlike micelles (Yang et al., *J. Phys. Chem. C,* 2009, 114:203-7). In typical experiments used to synthesize the series of PtRuFe nanowires as an example, for the relevant metal precursors, an aqueous mixture of hexachloroplatinic acid hydrate ($H_2PtCl_6 \cdot 6H_2O$, Alfa Aesar, 99.9%, 1.5 mM), ruthenium(III) chloride hydrate ($RuCl_3 \cdot xH_2O$, Acros Organics, 35-40% Ru, 1.5 mM) and iron(III) nitrate nonahydrate ($Fe(NO_3)_3 \cdot 9H_2O$, Aldrich, 98+%, 1.5 mM) was prepared in appropriate, stoichiometrically determined quantities. These solutions were then combined with a solution of hexadecyltrimethylammonium bromide (CTAB, Fluka, 40 mM) in chloroform (Acros, 99.8%) under stirring. Subsequently, 40 mL of $H_2O$ was also added under stirring for an additional 30 min. An aqueous solution of sodium borohydride (NaBH4, Alfa Aesar, 98% powder) was later used to reduce the metal ions encapsulated within the inverse micellar network, as denoted by a color change from a dark green to a dark gray/black hue. After an additional 20 minutes of stirring, as-synthesized nanowires were centrifuged. The supernatant was discarded and subsequently washed three times with 2 mL of ethanol followed by centrifugation for 2 min at 6000 rpm. Binary PtRu and PtFe NW controls were prepared analogously, using precursor concentrations of 2 mM in the absence of the third precursor.

The surfactant "contaminant" was removed using an effective cleaning protocol (Liu et al., *ACS Catal.,* 2014, 4:2544-44). Upon isolation of the NWs, these nano-materials were subsequently dispersed and "washed" in n-butylamine (Acros Organics, 99+%, 0.5 mg catalyst per mL) by sonication for approximately 30 seconds. The solution was then left to stir for 3 days at 400 rpm. The NWs were subsequently collected upon centrifugation at 5000 rpm for 5 minutes. The product was dispersed in 10 mL methanol and sonicated for 15 minutes. The solution was centrifuged again with the entire process repeated for an additional 2 times. The catalyst was later re-dispersed into ethanol prior to further use. Finally, the n-butylamine residue was removed by a combination of selective CO adsorption and subsequent CO stripping techniques.

2. Structural Characterization

Powder diffraction samples were prepared by dispersing the relevant NW samples into ethanol and drop casting the resulting slurry onto a glass microscope slide. Powder diffractograms of as-prepared NWs were obtained on a Scintag diffractometer, operating in the Bragg-Brentano configuration with Cu Kα radiation ($\lambda=1.54$ Å). Diffraction patterns were acquired from 35° to 85° at a scanning rate of 0.25° in 2θ per minute.

The structural morphology and crystallinity of as-prepared PtRu, PtFe, and PtRuFe NWs were characterized by transmission electron microscopy (TEM) obtained with a Technail2 BioTwinG2 TEM instrument, equipped with an AMT XR-60 CCD camera system. Energy dispersive X-ray spectroscopy (EDAX) was performed on a Leo 1550 field-emission scanning electron microscope (FE-SEM), operating at an accelerating voltage of 20 kV. High resolution transmission electron microscopy (HRTEM) and selected area electron diffraction (SAED) patterns were acquired on a JEOL 2100F instrument operating at accelerating voltages of 200 kV with a beam size of 2 Å. Additional HRTEM images and SAED patterns were collected using a JEOL 3000F microscope, equipped with a field-emission gun operating at an accelerating voltage of 300 kV.

3. Electrochemical Characterization

Electrochemical characterization of both as-prepared binary and ternary NWs was performed with the NWs supported onto a glassy carbon electrode (GCE; 5 mm, Pine Instruments). Initially, the electrode was polished to a mirror finish using an aluminum oxide powder slurry (0.050 μm particle size). Prior to deposition of the catalyst, the GCE surface was pre-modified with a thin layer of Vulcan XC-72R carbon in order to serve as a carbonaceous support structure for the as-prepared NWs. The NWs dispersed in ethanol (at a concentration of 2 mg $mL^{-1}$) were then loaded onto a modified GCE by adding two 5 μL drops of the catalyst dispersion onto the surface, which was subsequently allowed to dry in air. The GCE was later sealed with one 5 μL drop of an ethanolic 0.025% Nafion solution, prepared from a 5% stock solution.

Prior to electrochemical analysis, the catalyst-loaded GCE was immersed into fresh aliquots of water, so as to remove any impurities. In order to prepare the commercial standard, alloy-type $Pt_{1-x}Ru_x$('x'=0.5) NPs with a 20% precious metal content (ETek) were rendered into catalyst ink dispersions (1 mg $mL^{-1}$) in 25% isopropyl alcohol in water and deposited directly onto the surface of polished GCE for characterization. Electrochemical measurements were obtained in 0.1 M perchloric acid (Fisher Scientific, optima grade) solutions, created using high-purity water possessing a resistivity value of 18.2 M• cm. Pt foil and an Ag/AgCl combination (3 M Cl⁻) served as the counter and reference electrodes, respectively. All potentials have been reported with respect to the reversible hydrogen electrode (RHE).

The corresponding electrochemical properties of the binary and ternary catalysts were examined by cyclic voltammetry (CV) as well as using CO stripping voltammetry. CVs were obtained in the desired argon-saturated electrolyte at a scan rate of 20 mV s$^{-1}$. The adsorption of a monolayer of CO was accomplished by immersing the electrodes into a CO-saturated perchloric acid (Fisher Scientific, Optima grade) electrolyte for a period of 30 min. Subsequently, the electrode was transferred to a deoxygenated electrolyte solution, so as to obtain the corresponding CO stripping CV. The CO stripping process was implemented in order to remove n-butylamine from the NW surface in order to expose available active sites. The presence of CO effectively displaces residual n-butylamine, since CO possesses a higher affinity for adsorption and can be subsequently removed upon cycling. The electrochemically accessible surface area (ECSA) was calculated from the amount of integrated hydrogen adsorption (H$_{ads}$) determined in the cyclic voltammetry analysis, utilizing 210 µC cm$^{-2}$ as the conversion factor. As-obtained ECSA values represent a reasonable estimate of the active Pt and Ru sites in the system.

4. Measurement of the MOR and FAOR Kinetics

The MOR kinetics were measured by first obtaining CVs at a scan rate of 20 mV s$^{-1}$ in a deoxygenated 0.5 M methanol (Fisher Scientific, Optima grade) solution, supported in a 0.1 M HClO$_4$ electrolyte. Typically, a linear-sweep voltammogram (LSV) was obtained in the anodic sweep direction, so as to collect the MOR kinetics curves. The observed current was subsequently normalized to the Pt surface area, which can be determined from the H$_{ads}$ charge. After the initial LSV, collection of the MOR CVs was repeated to ensure that the surface of the catalyst was sufficiently stable in order to generate more reproducible CVs.

Chronoamperometry was also put to use in order to test the stability of the as-prepared catalysts. Chronoamperograms were obtained in a de-oxygenated 0.5 M methanol solution, supported in a 0.1 M HClO$_4$ electrolyte. The electrode was submerged and tested, while the potential was maintained at a value of 0.65 V for a period of one hour. This specific potential was used, due to the fact that it designates a potential that resides within the onset region of all of the catalysts tested herein, thereby allowing for an appropriate comparison of relative activity. The analogous formic acid oxidation kinetics data were acquired in a 0.1 M HClO$_4$ electrolyte in the presence of a 0.5 M formic acid solution (EMD, 98% ACS reagent grade). The same electrochemical parameters described above were applied. All electrodes described herein have been tested and run under identical conditions, in order to establish a self-consistent comparison amongst all of the electrodes. In particular, the activity of the novel PtRuFe NWs as well as of binary PtRu and PtFe NWs has been compared with respect to that of PtRu NP/C (Etek), serving as a commercial standard and control.

5. Ambient Synthesis and Characterization of PtRuFe NWs

In one embodiment of the present invention, an ambient wet synthesis technique to prepare ternary alloy nanowires under relatively mild reaction conditions is provided. By appropriately manipulating the stoichiometric ratios of the metal precursors, the constituent concentrations of each metal within the NWs are correspondingly varied, thereby allowing for the fabrication of homogeneous alloys with tunable compositions. The structure, purity, and crystallinity of the present ultrathin ternary NWs were analyzed using a suite of structural characterization techniques including XRD, TEM, and HRTEM.

Specifically, FIG. 1 highlights a number of powder XRD patterns obtained on the ternary PtRuFe systems (i.e. Pt$_7$Ru$_2$Fe NWs, Pt$_7$Ru$_{1.5}$Fe$_{1.5}$ NWs, Pt$_7$RuFe$_2$ NWs, and Pt$_7$Ru$_{0.5}$Fe$_{2.5}$ NWs, respectively) as well as on controls consisting of binary Pt$_7$Ru$_3$, Pt$_7$Fe$_3$, and mono-metallic Pt NWs. All seven NW samples possessed peaks located at 39°, 46°, and 67°, which can be ascribed to the corresponding (111), (200), and (220) planes of an underlying Pt fcc framework structure (JCPDS database #04-0802). It is evident that the patterns are devoid of peaks that can be attributed to either the elemental ruthenium or iron phases (JCPDS database #06-0663 and #85-1410, respectively), thereby suggesting that reduction of the precursors can result in the formation of uniform alloys. Moreover, no apparent peaks ascribable to any possible impurities within the nanowires could be observed, indicative of the reasonably high purity of the samples. Nevertheless, for the series of PtRuFe NWs, slight shifts to higher 2θ are noted for the Pt (111) peak, likely due to the contraction of the Pt lattice by the incorporation of both Ru and Fe. The broadness of the peaks can potentially be attributed to both the inherently small sizes of the NWs tested (i.e. diameters under 5 nm) as well as to their intrinsic segmented texture.

All samples possess an average cross-sectional diameter in the range of 1.9 to 2.2 nm. The usefulness and relevant applicability of the wet synthesis method are evident, as the nanowires produced are effectively homogeneous and monodisperse, and moreover, their diameters are reasonably uniform, even while possessing a host of chemical compositions.

Higher-resolution TEM images confirm that the interconnected nanowires are segmented and consist of constituent single-crystalline segments with overall lengths exceeding 100 nm (Koenigsmann et al., *J. Am. Chem. Soc.*, 2011, 133:9783-95). These data are consistent with the selected area electron diffraction patterns, which collectively indicate that all of the samples maintain a polycrystalline texture. The corresponding lattice parameters were determined from the SAED data as well as deduced from the HRTEM images. Specifically, the alloy-type NWs possessed measured d-spacings that correspond to the (111) plane of these various alloys, and these values are actually all within experimental error. The slight contraction in the lattice parameters with respect to that of elemental Pt is consistent with that of prior reports in the literature, due to the incorporation of Ru and Fe into the Pt lattice, thereby causing a slight contraction of the fcc lattice. As a result, the SAED patterns and the XRD data further confirm the highly uniform and homogeneous alloyed nanowires, possessing a variety of desired compositions.

To complement these data, the actual chemical composition of the nanowire samples was determined using energy dispersive X-ray spectroscopy (EDAX). The elemental results are consistent with the expected chemical compositions based on the precursor concentrations used. As a result, both Fe and Ru are present in these samples with their chemical compositions predicted within experimental error. An eighth sample (Pt$_7$Ru$_{2.5}$Fe$_{0.5}$ NW) was synthesized. Although the structural and atomic compositions were within error, this particular sample did not evince reliable, interpretable electrochemical results, which might have been due to the relatively small amount of Fe present in the sample. Specifically in this NW sample, as a result of preferential surface dissolution, the Fe may have chemically leached out during electrochemical data acquisition, thereby altering its inherent composition so as to become more similar to that of $Pt_8Ru_2$ NWs. Nevertheless, overall, the XRD data coupled with the TEM and SEM-EDAX measurements together confirm that there is a high degree of correlation between the chemical composition of the precursor solutions and the corresponding composition of the resulting NWs.

6. Correlating Composition of Homogeneous Alloy Catalysts with MOR

Figure 2A:
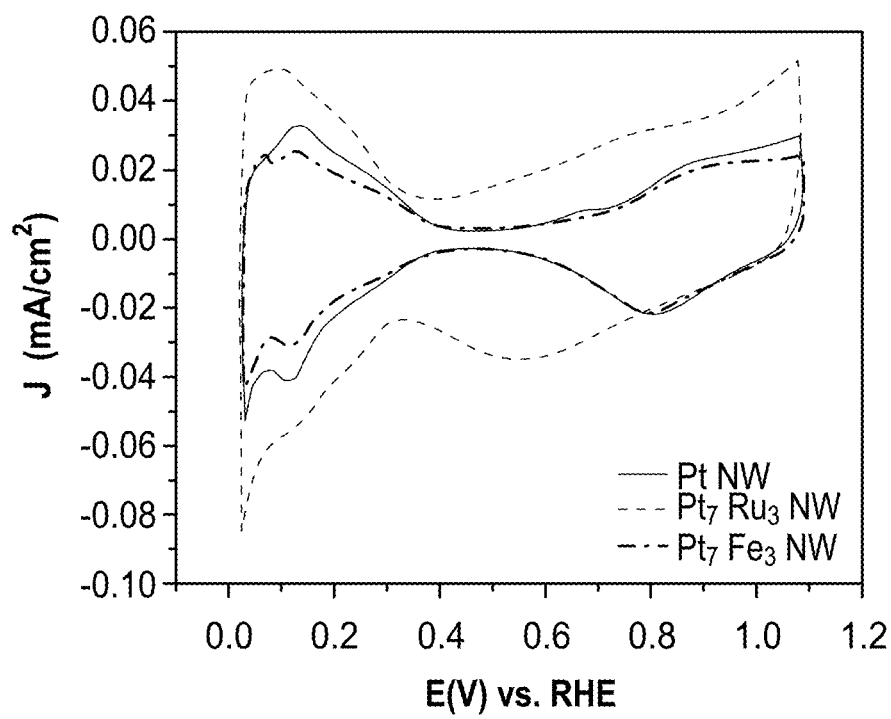
FIG. 2A shows representative CV curves in an argon-saturated 0.1 M HClO$_4$ solution, obtained at a scan rate of 20 mV s$^{-1}$ with the current normalized to ECSA for Pt NWs, Pt$_7$Ru$_3$ NWs, and Pt$_7$Fe$_3$ NWs.
Figure 2B:
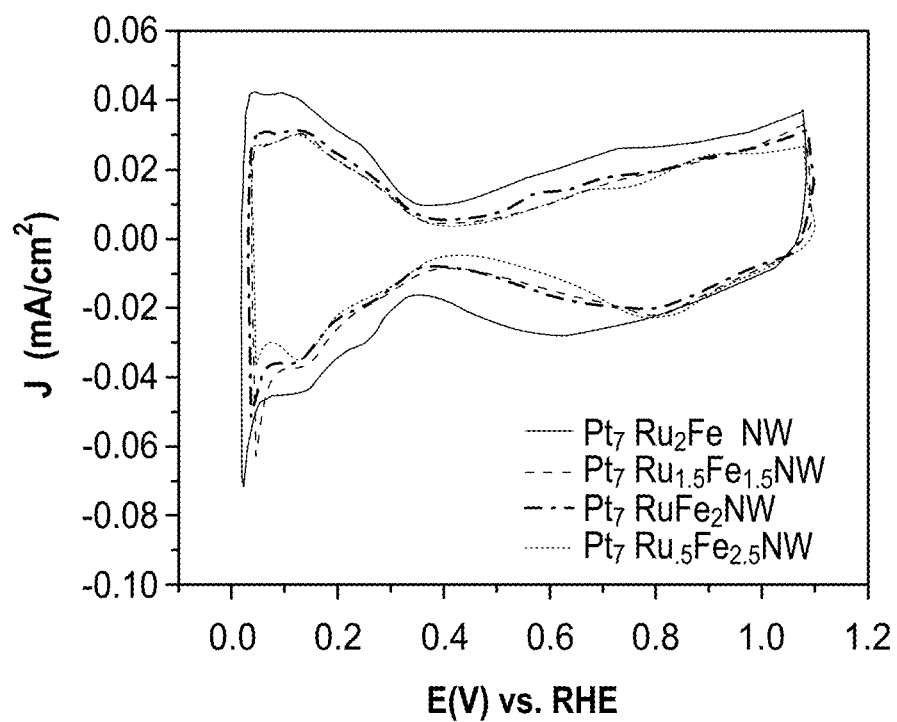
FIG. 2B shows Pt$_7$Ru$_2$Fe NWs, Pt$_7$Ru$_{1.5}$Fe$_{1.5}$ NWs, Pt$_7$RuFe$_2$ NWs, and Pt7Ru0.5Fe2.5 NWs.
Figure 3:
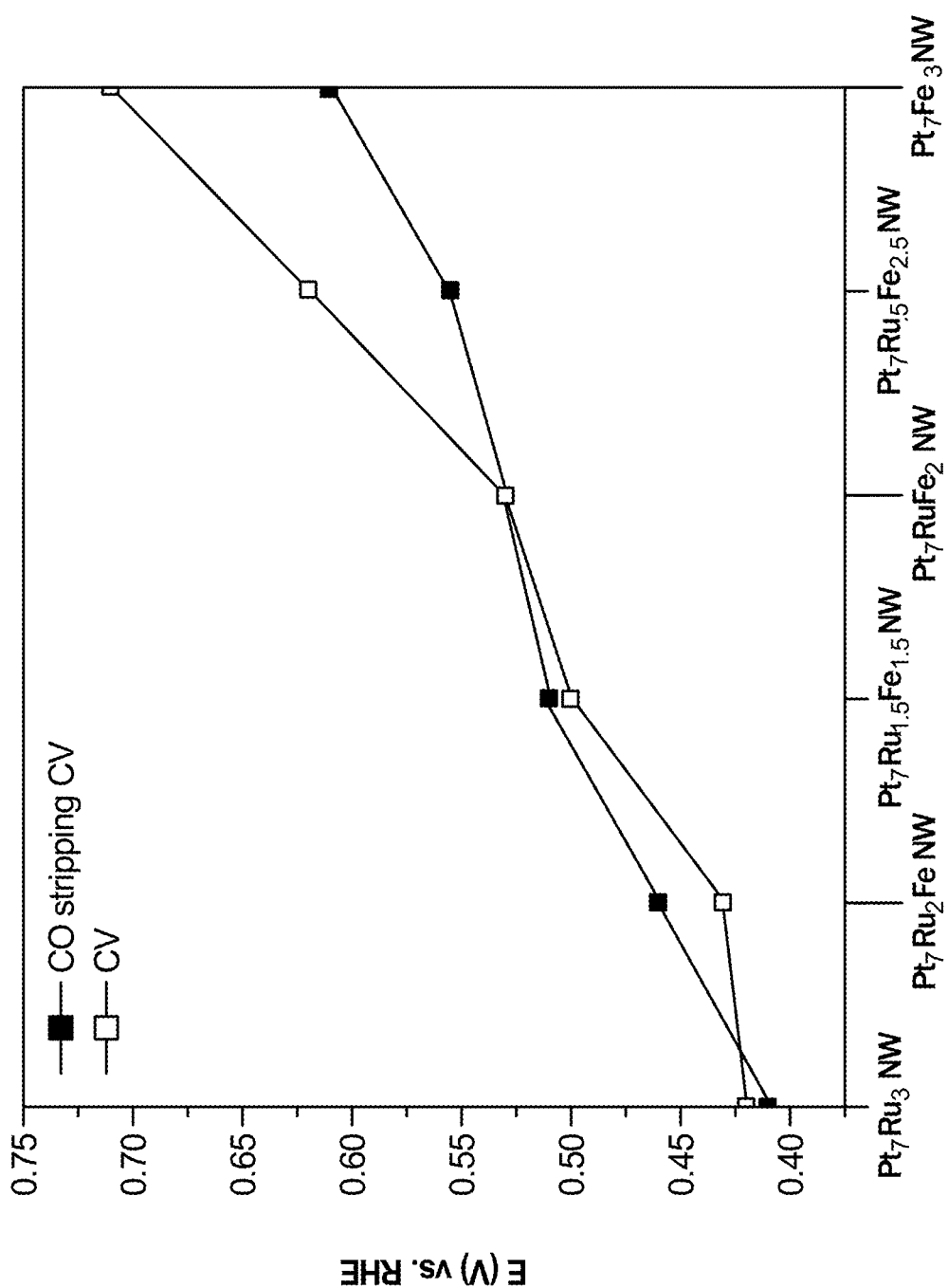
FIG. 3 shows a plot investigating the trend in onset potential for CO stripping and the corresponding onset of surface oxide reduction as a function of systematically varying chemical composition from Pt$_7$Ru$_3$ NWs to Pt$_7$Fe$_3$ NWs.

As shown in FIGS. 2A and B, CVs were obtained for Pt NWs, $Pt_7Ru_3$ NWs, $Pt_7Fe_3$ NWs, as well as the series of four ternary PtRuFe NWs in order to investigate and correlate the impact of altering Ru and Fe ratios on electrochemical performance. Regarding the substructure of the CVs, the shape and location of the observed hydrogen and oxygen adsorption features associated with the $Pt_7Ru_3$ NW catalyst are consistent with prior reports of homogeneous $Pt_{1-x}Ru_x$ alloy type nanowires (Koenigsmann et al., ACS Appl. Mater. Interfaces, 2013, 5:5518-30; Antolini, E., Mater. Chem. Phys., 2003, 78:563-73). Interestingly, a significant upshift of the oxide reduction peak of ~200 mV is noted, as the Fe content is increased from 10% to 25% in the $Pt_7Ru_2Fe$ and $Pt_7Ru_{0.5}Fe_{2.5}$ catalysts, respectively. FIG. 3 depicts the linear trend and correlation between onset potential and corresponding alterations in atomic composition. This apparent shift in the surface oxide reduction peak suggests a weakening of the interaction with the oxygen adsorbate and has been observed by previous groups. (Long et al., Nano Energy, 2013, 2:636-76; Antolini, E., Mater. Chem. Phys., 2003, 78:563-73; Stamenkovic et al, J. Am. Chem. Soc., 2006, 128:8813-19).

Without wanting to be bound to a mechanism, this observation is attributed to a restructuring effect associated with the as-processed nanowires. Specifically, dissolution is known to occur for a variety of transition metals, including Fe, Ni, and Co, especially when localized at the surface and exposed to anodic potentials (Toda et al., J. Electrochem. Soc., 1999, 146:3750-56). Therefore, as the amount of Ru decreases and is effectively substituted with increasing Fe content, any Fe present within these alloys would tend to be preferentially consolidated and incorporated as part of the nanowire core due to the likely dissolution and subsequent removal of Fe at the exposed surface. As a result, the dissolution of iron and concomitant formation of a Pt-rich surface typically results in improved catalytic performance, owing to the unique structural and electronic effects imparted by the interactions between the Pt-rich surface and the alloy-type core. Corroborating evidence for the enrichment of Pt at the catalytic interface is also apparent in the hydrogen adsorption region, which shows increasing Pt-like character as the Fe content is increased from 10 to 25%; such an observation has also been noted for $Pt_7Fe_3$ NWs.

It is evident from the $H_{ads}$ results that Pt is increasingly enriched at the catalytic interface as a function of the decreasing amount of Ru present within the catalyst due to preferential Fe surface dissolution. Nevertheless, it is interesting to note that while the onset of oxide formation for $Pt_7Ru_3$ NWs and for Fe-doped $Pt_7Ru_2Fe$ NWs is similar, the corresponding observed onset for the $Pt_7Ru_{1.5}Fe_{1.5}$ NWs as well as for the remaining ternary catalysts analyzed shifted slightly to higher potentials, denoting behavior analogous to that for the $Pt_7Fe_3$ NW catalyst.

To explain all of these data, it is known that in the case of $Pt_{1-x}Ru_x$ alloys, the presence of Pt—Ru pair sites increases MOR catalytic performance by facilitating the oxidation of adsorbed CO species at potentials lower than those observed on elemental Pt as a result of a process referred to as "carbonyl-spillover." That is, in the presence of Ru, adsorbed CO species generated by the rapid dehydrogenation of methanol at Pt active sites can functionally 'spill over' and react with RuOH species, thereby forming $CO_2$. Thus, the CV results suggest that the Fe-doped PtRu NWs may actually benefit from the complementary beneficial effects of (i) the bifunctional mechanism, wherein —OH species dissociated from water and adsorbed onto the Ru surface catalyze the removal of CO adsorbed onto Pt active sites at lower potentials, thereby increasing the overall activity of $Pt_{1-x}Ru_x$-based alloys, as well as (ii) the favorable electronic effects associated with PtFe alloys, in which the presence of Fe functionally lowers the d-band center of the Pt, thereby resulting in more d-band vacancies and therefore, overall less susceptibility to poisoning of active sites by CO species formed as intermediates in the indirect oxidation of methanol.

Figure 4A:
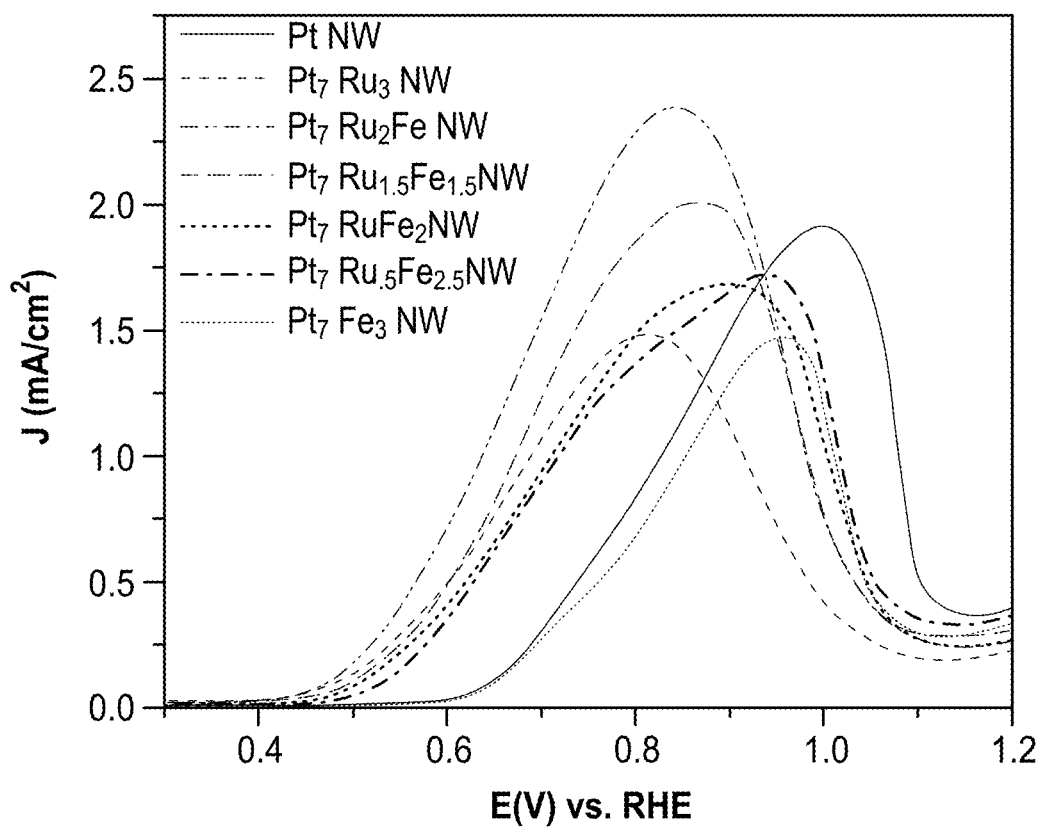
FIG. 4A Cyclic voltammograms for the methanol oxidation reaction in an argon-saturated 0.1 M HClO$_4$+0.5 M CH$_3$OH solution, obtained at a scan rate of 20 mV s$^{-1}$ with the current normalized to ECSA.

In order to evaluate the methanol oxidation performance, all seven nanowire catalysts were tested electrochemically by comparison with commercial PtRu/C serving as a standard and the resulting linear sweep voltammograms (LSVs) are shown in FIG. 4. $Pt_7Ru_2Fe$ NWs evinced the highest MOR activity, generating an activity of 2.27 mA cm$^{-2}$ at 0.8 V vs. RHE; analogous $Pt_7Ru_{1.5}Fe_{1.5}$, $Pt_7RuFe_2$, $Pt_7Ru_{0.5}Fe_{2.5}$, $Pt_7Ru_3$, and $Pt_7Fe_3$ NWs yielded notably lower activities with values of 1.86 mA cm$^2$, 1.46 mA cm$^{-2}$, 1.35 mA cm$^{-2}$, 1.46 mA cm$^{-2}$, and 0.67 mA cm$^{-2}$, respectively.

Figure 4B:
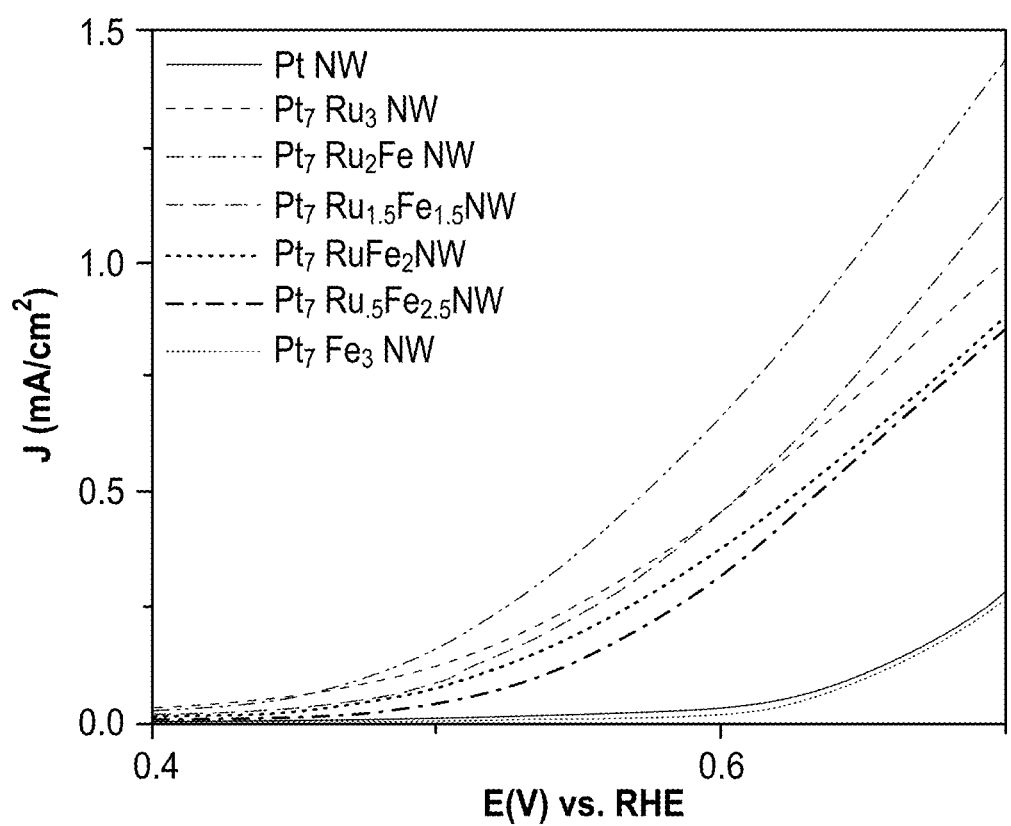
FIG. 4B Magnification of the MOR onset region highlighted between 0.4-0.7 V vs. RHE.
Figure 4C:
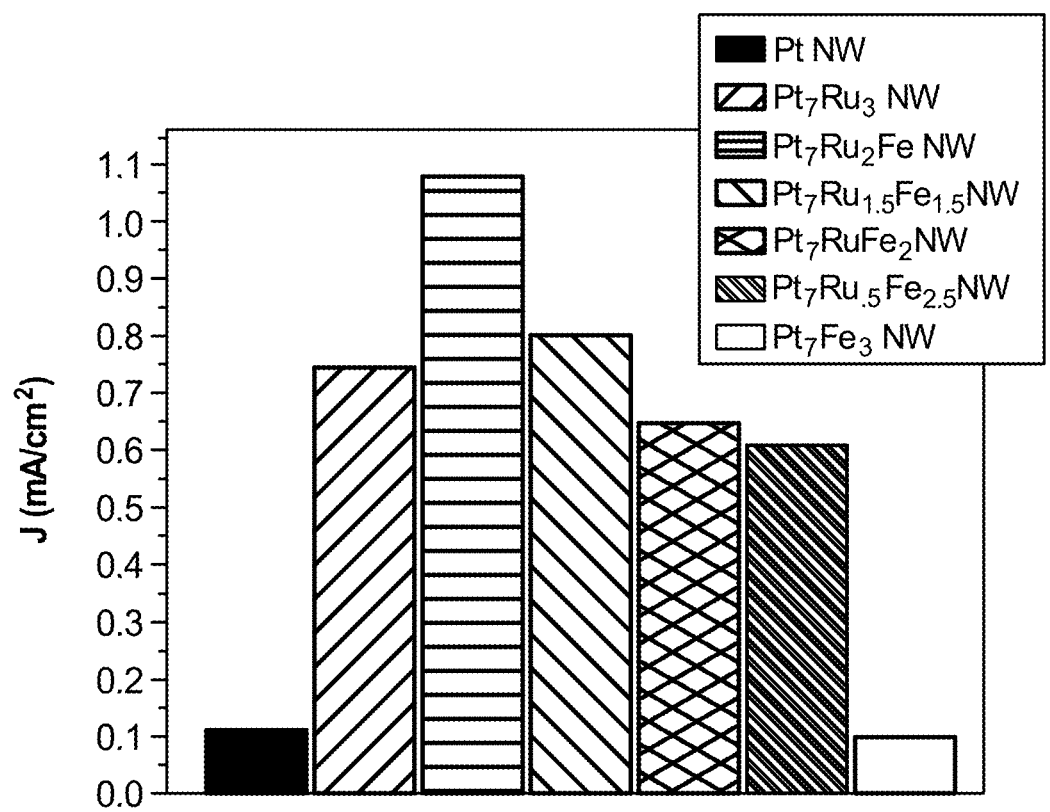
FIG. 4C Bar graph highlighting MOR activity at E (V) vs. RHE=0.65 V for Pt NWs, Pt$_7$Ru$_3$ NWs, Pt$_7$Ru$_2$Fe NWs, Pt$_7$Ru$_{1.5}$Fe$_{1.5}$ NWs, Pt$_7$RuFe$_2$ NWs, Pt$_7$Ru$_{0.5}$Fe$_{2.5}$ NWs, and Pt$_7$Fe$_3$ NWs.

Analyzing the onset region shown in FIG. 4B, it is apparent that $Pt_7Ru_2Fe$ possessed the lowest onset potential of all the NWs tested with a potential of ~0.44 V. FIG. 4C depicts a bar graph comparing the MOR activity at a representative potential of 0.65 V, which was in the onset region of the LSV. From these data, a specific activity of 1.10 mA cm$^{-2}$ was measured for the best MOR catalyst tested, namely $Pt_7Ru_2Fe$ NWs, which is 11-fold higher than that of $Pt_7Fe_3$ and Pt NWs (0.10 mA cm$^{-2}$) and almost 2-times greater as compared with the 'starting point', i.e. the as-synthesized $Pt_7Ru_3$ NWs (0.75 mA cm$^{-2}$). More importantly, a volcano-type trend in activity across the series of samples was demonstrated, further supporting the claim that chemical composition is crucial to electrocatalytic performance. Moreover, the numbers reproducibly obtained with the ternary NWs are higher in magnitude as compared with other prior reports of PtRuFe catalysts, and even significantly outperformed conventional commercial standards, such as PtRu NP/C.

7. Correlating Composition of Alloy Catalysts with MOR and FAOR Mechanisms

Insights into the observed enhancements have been found, i.e. encouraging shifts in potential and activity in the trimetallic Fe-containing PtRuFe NWs, and a determination whether these phenomena are dependent upon and can therefore be tuned by predictively tailoring chemical composition. Therefore, in experiments aimed at completing the activity analysis and understanding the overall potential of the present catalysts, the performance of the nanowires toward the catalytic oxidation of CO and formic acid was investigated, which represent two potential critical intermediates in the oxidation of methanol.

MOR. To date, two distinctive MOR oxidation pathways have been proposed in the literature to explain the measured enhancement in performance for simulated bimetallic alloy systems. In the case of the conventional "CO pathway" or indirect pathway, it is calculated that the rate-determining step is the dehydrogenation of $CHO_{ads}$ to CO, which has a considerable energy barrier of 0.98 eV. The indirect pathway is anticipated to be more significant if adsorbed OH species are not available at the catalytic interface. By contrast, calculations reveal that a direct, CO free pathway is favored, wherein formic acid (HCOOH) is rapidly produced as a weakly bound intermediate species by the reaction of the $CHO_{ads}$ with $OH_{ads}$. In this CO free pathway, the scission of the O—H bond of HCOOH represents the rate determining step with a significantly lower energy barrier of 0.75 eV. Thus, the theoretical results suggest that the direct pathway should prevail in the case wherein adsorbed OH species are readily available, leading to the formation of HCOOH as the primary intermediate. Therefore, the direct pathway is readily distinguishable from its indirect counterpart by the collective presence of $HCOOH_{ads}$ and $OH_{ads}$ species in the former, as opposed to the predominant occurrence of only $CO_{ads}$ in the latter.

A number of factors can influence the principal pathway, such as potential, flow rate, and methanol concentration. Currently, experimental evidence for both mechanisms relies primarily on the measured MOR kinetics and an ex situ spectroscopic analysis of electrocatalysts. Therefore, it is necessary to study the oxidation behavior of both methanol and formic acid in order to pinpoint the effects that promote enhanced performance.

Figure 2C:
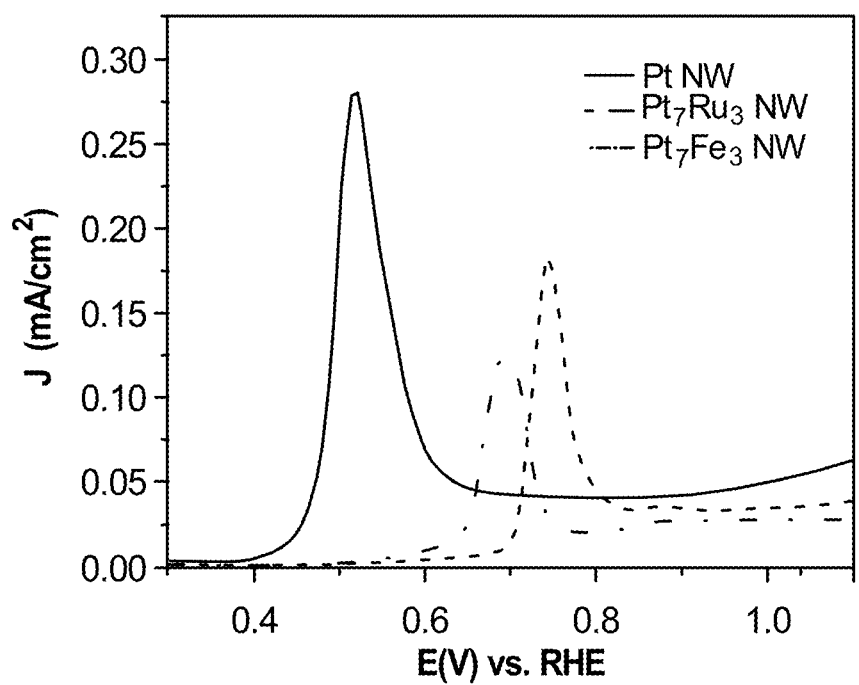
FIG. 2C shows representative CO stripping LSV curves for Pt NWs, Pt$_7$Ru$_3$ NWs, and Pt$_7$Fe$_3$ NWs.
Figure 2D:
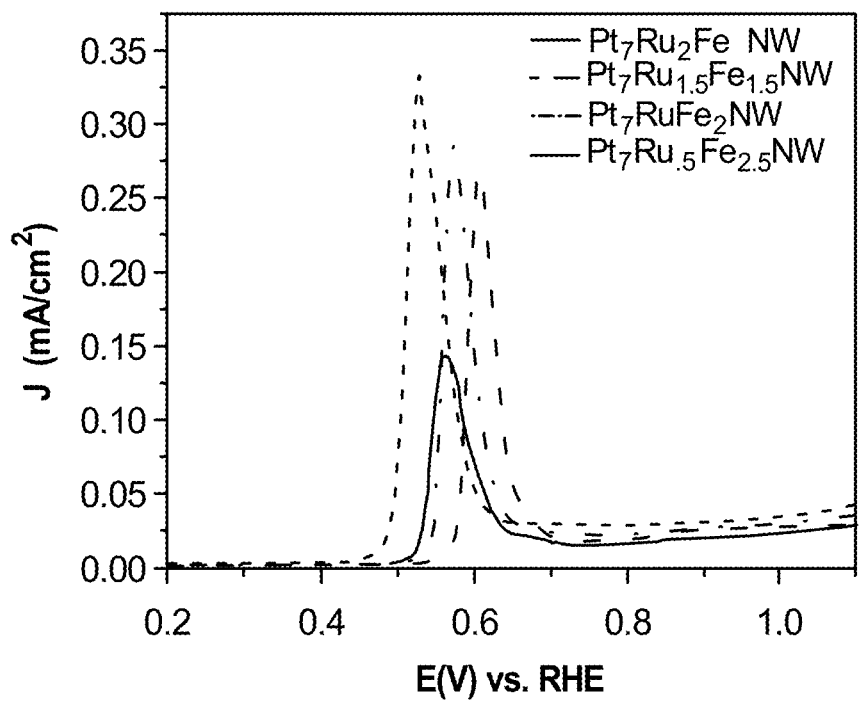
FIG. 2D shows Pt$_7$Ru$_2$Fe NWs, Pt$_7$Ru$_{1.5}$Fe$_{1.5}$ NWs, Pt$_7$RuFe$_2$ NWs, and Pt$_7$Ru$_{0.5}$Fe$_{2.5}$ NWs.

Initially, CO stripping LSVs were collected to analyze the CO tolerance of each catalyst, as observed in FIGS. 2C and D. The currents measured for each sample were normalized to the electrochemically active surface area (ECSA), which was determined from the hydrogen adsorption region ($H_{ads}$). As can be observed, the CO onset potential for the Pt NWs (black line) occurs at ~0.69 V. As more Ru is added (30 atom %), the onset is shifted to a lower potential (i.e. ~0.41 V), consistent with the bifunctional mechanism; the presence of additional Ru sites enables OH species to be adsorbed at lower potentials, thereby facilitating the removal of adsorbed CO species from Pt active sites. The CO stripping onset values for the various ternary catalysts are shown as a function of NW composition in FIG. 3 and highlight an approximately linear, monotonic correlation between NW composition and the CO stripping onset potential.

This apparent and proportional increase in the CO onset potential with a concomitant rise in Fe content in the composition of ternary NW catalysts is consistent with the relative enrichment of Pt at the interface, due to selective dissolution of Fe sites which correspondingly promotes the formation of a Pt surface layer with an alloy core. Such behavior can also be explained by the corresponding decrease in Ru content, which is responsible for adsorbing OH species that assist in subsequent CO oxidation on the Pt surface. All of these trends are consistent with prior reports, although the onset potentials measured in the Fe-doped, ultrathin NWs are measurably lower as compared with values observed for analogous systems.

Although this trend in CO onset potential (i.e. systematic decrease with increasing Ru metal content) supports the presence of the bifunctional mechanism, it does not fully describe the complicated and synergistic interactions between Pt, Ru, and Fe, and their combined effect upon the resulting MOR mechanism. However, as previously mentioned during the analysis of the CV data, the catalyst possessing only 10% Fe dopant to replace Ru gave rise to a similar onset potential for oxide adsorption as that of control $Pt_7Ru_3$ NWs, an observation which further corroborates the viability of a ligand effect, in which the presence of Fe is less conducive to the formation of an adsorbed CO intermediate. In effect, the $Pt_7Ru_2Fe$ nanowires were found to give rise to the lowest onset potential and highest MOR activity (FIG. 4), presumably due to a diminished affinity towards CO and the corresponding presence of more available Pt active sites for MOR.

In terms of the effect of the ultrathin NW morphology, recent work has shown that the segmented texture results in the production of well-ordered smooth crystalline planes along the single crystalline segments as well as defect sites present at the interconnects between segments. Typically, CO binds rather strongly to well-ordered active sites, thereby requiring a higher potential for its removal. Defect sites, on the other hand, require a lower potential for the elimination of CO species. As a result, elemental ultrathin Pt NWs are particularly active toward alcohol oxidation due to their overall enhanced ability to oxidize CO. That is, since CO can be oxidized at relatively lower potentials as compared with their larger diameter nanowire analogues, ultrathin Pt nano-wires provide for more active sites to be available for MOR. Hence, on the basis of the present CO stripping results, it is shown that the CO oxidation performance of ultrathin nanowires can be purposely enhanced by tailoring chemical composition.

FAOR. To more fully investigate the relative contributions of the bi-functional mechanism and ligand effect with respect to the results, formic acid oxidation was probed as well for all of the catalysts, using Pt NWs as a standard reference. The data are shown in FIG. 5. Typically, formic acid oxidation (FAOR) can occur either directly (eqn (3)) or indirectly (eqn (4)) through the generation of the intermediate CO. The indirect CO-mediated pathway is favored on the surfaces of Pt-based catalysts, but is nevertheless unlikely, due to the poisoning effects of the CO intermediate that is generated.

$$HCOOH \rightarrow CO_2 + 2e^- + 2H^+ \qquad (3)$$

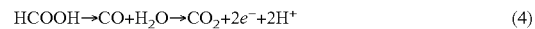

$$HCOOH \rightarrow CO + H_2O \rightarrow CO_2 + 2e^- + 2H^+ \qquad (4)$$

Figure 5A:
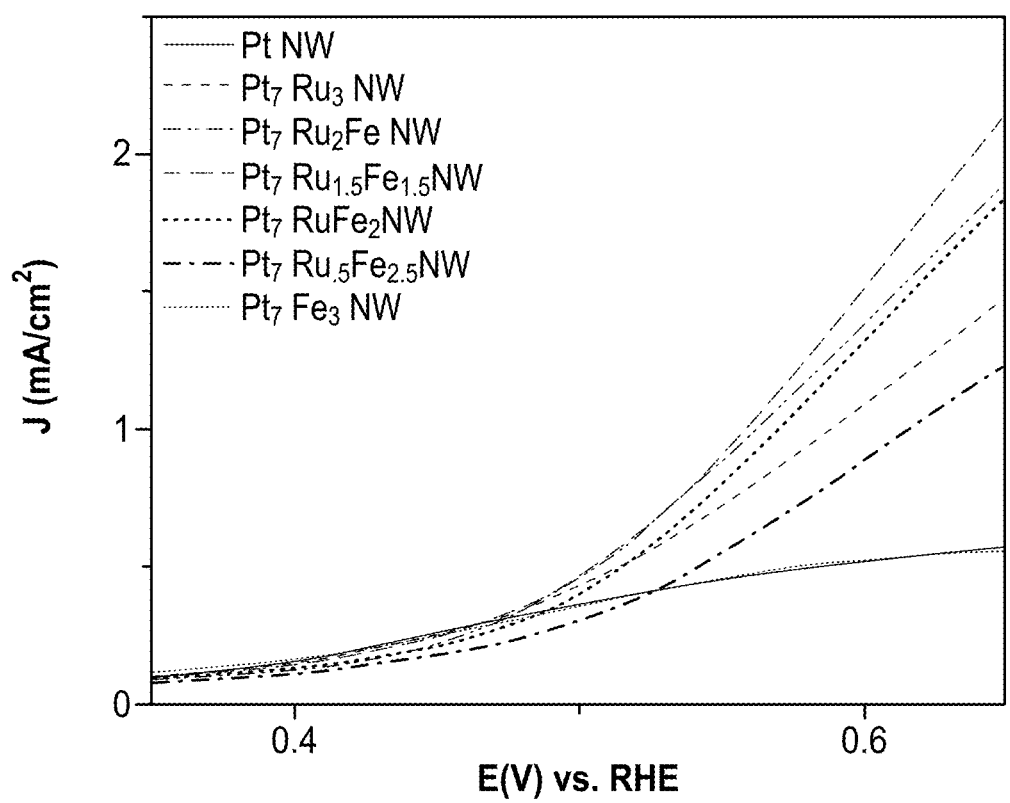
FIG. 5A Cyclic voltammograms for the formic acid oxidation reaction in an argon-saturated 0.1 M HClO$_4$+0.5 M HCOOH solution, obtained at a scan rate of 20 mV s$^{-1}$ with the current normalized to ECSA.
Figure 5B:
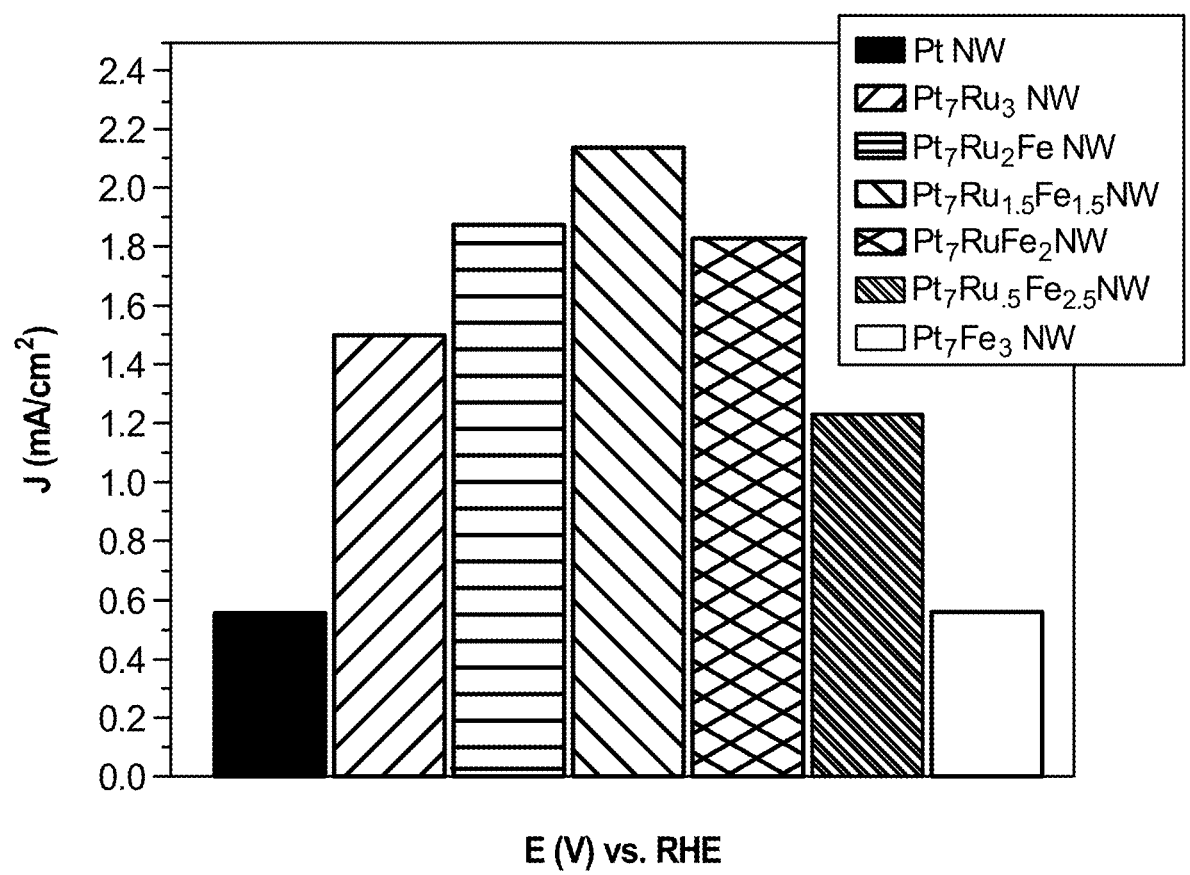
FIG. 5B Bar graph demonstrating FAOR activity at E (V) vs. RHE=0.65 V for Pt NWs, Pt$_7$Ru$_3$ NWs, Pt$_7$Ru$_2$Fe NWs, Pt$_7$Ru$_{1.5}$Fe$_{1.5}$ NWs, Pt$_7$RuFe$_2$ NWs, Pt$_7$Ru$_{0.5}$Fe$_{2.5}$ NWs, and Pt$_7$Fe$_3$ NWs.

FIG. 5A depicts the onset region for formic acid oxidation. As can be observed, for all nanowires analyzed, the $Pt_7Ru_{1.5}Fe_{1.5}$ NW catalyst not only possesses the lowest onset potential (0.38 V) for the oxidation of formic acid but also exhibits the fastest kinetics for the reaction, as indicated by its steepest slope. FIG. 5B highlights a bar graph, describing the overall activity of each catalyst towards FAOR measured at a potential of 0.65 V.

Of the samples tested, the $Pt_7Ru_{1.5}Fe_{1.5}$ NW catalyst yielded the highest activity observed (2.15 mA cm$^{-2}$), which is nearly four times that of as-prepared Pt NWs (0.58 mA cm$^{-2}$). It is noted that the activities of the remaining catalysts also follow a volcano-type trend, similar to what had been previously found for the MOR data in FIG. 4. Specifically, these catalysts achieved FAOR activities of 1.90 mA cm$^{-2}$ ($Pt_7Ru_2Fe$ NWs), 1.83 mA cm$^{-2}$ ($Pt_7RuFe_2$ NWs), 1.22 mA cm$^{-2}$ ($Pt_7Ru_{0.5}Fe_{2.5}$ NWs), 1.50 mA cm$^{-2}$ ($Pt_7Ru_3$ NWs), and 0.55 mA cm$^{-2}$ ($Pt_7Fe_3$ NWs), respectively, all of which fall slightly below that of the 'peak' value observed for $Pt_7Ru_{1.5}Fe_{1.5}$ NWs. Moreover, the ternary catalysts also outperformed that of commercial PtRu NP/C.

A similar onset potential value for both $Pt_7Ru_2Fe$ NW and $Pt_7Ru_{1.5}Fe_{1.5}$ NW catalysts indicated that the parameter of onset potential was not necessarily influenced by their corresponding CO stripping abilities. More specifically, it was found that catalysts possessing the lowest onset for the methanol oxidation reaction and formic acid oxidation reaction did not necessarily give rise to the lowest onset potential for CO stripping.

Comparison of and insights into MOR and FAOR data. As a result, by rationally tailoring chemical composition of Pt-based alloys within the 30% overall metal dopant (i.e. RuM content) window worked with in recognition of the high performance of $Pt_7Ru_3$ alloys serving as the 'base' control composition, precise optimization of the most advantageous percentage permutation of metals for each of the reactions analyzed herein has be effected. Specifically, by adding in only 10% Fe to replace Ru as part of the PtRuM alloy, a catalyst with the lowest onset potential for MOR was synthesized, indicative of the fastest reaction kinetics, as well as the highest activity for the MOR process. By adding in 15% Fe to replace Ru in the PtRuM alloy, not only was a lower onset generated but also a higher overall electrochemical activity for FAOR, presumably because of the combination of (i) the extra Fe content, which yielded a decreased affinity for poisoning species (such as CO) and therefore a shift of the formic acid absorption to lower potentials, coupled with (ii) the presence of 15% Ru content associated with removing deleterious analogous poisonous species from Pt active sites at lower potentials. Overall, these results therefore suggest that catalysts need to be precisely tailored in terms of chemistry in order to synthesize the ideal alloy composition for each reaction.

In FIG. 2, in effect, two distinctive trends were observed, one specifically related to Ru content and another associated with the Fe content. In the cathodic sweep, a shift to lower potentials occurred with the addition of more Ru dopant within a PtRu catalyst as compared with pure Pt, possibly as a result of the bi-functional mechanism. Upon the subsequent addition of 10% Fe to replace Ru, no apparent shift in the oxide reduction peak was visible, as compared with the $Pt_7Ru_3$ catalysts, suggesting that there may have been the same amount of —OH species absorbed onto the surface.

Such an observation would suggest the presence of a ligand effect. By contrast, by adding in 15-30% Fe and correspondingly decreasing the overall Ru content, the catalysts became more 'noble' as compared with $Pt_7Ru_3$ NW catalysts, due to the relative increase of Pt at the surface (i.e. through the ligand effect) as noted by the shift to higher potentials for the reduction of oxide species. The fact that the $Pt_7Fe_3$ NW catalyst evinced a similar onset as compared with Pt can be explained in terms of this phenomenon. Overall, based solely on the surface structure analysis of these catalysts by CV, the $Pt_7Ru_2Fe$ NW catalyst appeared to exhibit the highest catalytic activity towards MOR. As a result herein, it has been demonstrated that both the oxidation of methanol and formic acid are governed by two contrasting trends. Specifically, methanol oxidation appears to be predominantly influenced by the Ru content, whereas formic acid oxidation is primarily impacted by the corresponding Fe content within the ternary metal alloy catalyst itself. Therefore, by carefully optimizing and tuning chemical composition, a synergistic balance between these two competing behaviors has been created to generate the best compromise catalyst for the overall methanol oxidation reaction, in this case, the $Pt_7Ru_2Fe$ NW catalyst.

To take these results a step further, chronoamperometric experiments (FIG. 6) were run in order to probe the stability of the as-prepared nanowire catalysts during methanol oxidation. It has been demonstrated that by using this unique ternary alloy system, the catalyst stability could be readily increased as compared with a commercial PtRu NP standard. Overall, once these catalysts became stable, the ternary NW catalyst maintained higher steady state current densities of 0.605 mA $cm^{-2}$ over the whole time range of 60 minutes as compared with a conventional PtRu NP/C catalyst (i.e. current density of 0.051 mA $cm^{-2}$), thereby suggesting not only increased stability but also greater catalytic activity for the NW species.

The enhanced stability of NWs versus NPs has been previously ascribed to stronger NW interactions with the carbon support as well as to an inherently greater NW structural stability, especially under acidic MOR conditions. It should also be noted that commercial Pt NP/C achieve comparable steady state current densities as compared with that of the PtRu NP/C controls. These results simply reinforce the fact that the present ternary $Pt_7Ru_2Fe$ system represents a more active and stable catalyst for MOR as compared with conventional and even commercial choices.

The invention claimed is:

1. A method of producing ternary metal-based nanowire networks, the method comprising:
    combining an aqueous mixture of a platinum hydrate, a ruthenium hydrate, and an iron hydrate with a solution of hexadecyltrimethylammonium bromide in chloroform to form an inverse micellar network;
    adding a reducing agent to reduce metal ions within the inverse micellar network; and
    isolating the nanowires,
wherein the nanowires are homogeneous alloys, wherein the relative amount of the platinum, ruthenium and iron in the mixture correlate to the atomic ratio of the platinum, ruthenium and iron in the ternary nanowires, wherein the diameters of the ternary nanowires are from about 0.5 nm to about 5 nm.

2. The method of claim 1, wherein the formula of the nanowires is $Pt_7Ru_2Fe$, $Pt_7Ru_{1.5}Fe_{1.5}$, $Pt_7RuFe_2$, or $Pt_7Ru_{0.5}Fe_{2.5}$.

3. The method of claim 1 wherein the platinum hydrate is hexachloroplatinic acid hydrate ($H_2PtCl_{6.6}H_2O$).

4. The method of claim 1 wherein the ruthenium hydrate is ruthenium(III) chloride hydrate ($RuCl_3.xH_2O$).

5. The method of claim 1 wherein the iron hydrate is iron(III) nitrate nonahydrate ($Fe(NO_3)_3.9H_2O$).

6. The method of claim 1 wherein the reducing agent is sodium borohydride ($NaBH_4$).

7. The method according to claim 1 wherein the diameters of the ternary nanowires are less than about 2 nm.

* * * * *

UNITED STATES PATENT AND TRADEMARK OFFICE
CERTIFICATE OF CORRECTION

PATENT NO. : 10,804,543 B2  
APPLICATION NO. : 15/092530  
DATED : October 13, 2020  
INVENTOR(S) : Stanislaus Wong et al.

Page 1 of 1

It is certified that error appears in the above-identified patent and that said Letters Patent is hereby corrected as shown below:

In the Specification

Column 8, Line 64:  
Now reads: "18.2 M• cm"  
Should read: -- 18.2 MΩ cm --

Column 14, Line 55:  
Now reads: "($Pt_7Ru_5Fe_{2.5}$ NWs)"  
Should read: -- ($Pt_7Ru_{0.5}Fe_{2.5}$ NWs) --

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*